United States Patent [19]
Amass

[11] 4,124,778
[45] Nov. 7, 1978

[54] DIGITAL FRAME SYNCHRONIZING CIRCUIT

[75] Inventor: Peter Amass, Camarillo, Calif.

[73] Assignee: Minnesota Mining and Manufacturing Company, Saint Paul, Minn.

[21] Appl. No.: 847,924

[22] Filed: Nov. 2, 1977

[51] Int. Cl.$^2$ ............................ H04J 3/06; H04L 7/08
[52] U.S. Cl. ................................ 179/15 BS; 178/69.1; 325/38 A; 340/347 DD
[58] Field of Search .............. 178/69.1, 68; 325/38 A; 340/347 DD; 179/15 BS

[56] References Cited
U.S. PATENT DOCUMENTS

| | | | |
|---|---|---|---|
| 4,002,845 | 1/1977 | Kaul et al. | 179/15 BS |
| 4,010,421 | 3/1977 | Lind | 325/38 A |
| 4,020,282 | 4/1977 | Halpern | 325/38 A |
| 4,045,613 | 8/1977 | Walker | 178/69.1 |
| 4,054,754 | 10/1977 | Nicodemus et al. | 178/69.1 |

*Primary Examiner*—Thomas A. Robinson
*Attorney, Agent, or Firm*—Cruzan Alexander; Donald M. Sell; William B. Barte

[57] ABSTRACT

A circuit is disclosed for serially formatting digital information such as may be provided in a digital audio magnetic tape recorder in a succession of data blocks or frames, each containing the same number of digital bits and in which each frame is delineated by a uniquely occurring digital frame synchronizing signal. The digital information is formatted in a Miller or 3F code in which allowable transitions between successive "1"s and "0"s result in pulses which are 1, 1-½ or 2 times the duration of a bit cell, hence giving rise to three characteristic frequencies and the term 3F code. The frame synchronizing signal is generated by providing a signal comprising digital bits 1-0-0-1, which signal in a 3F code is characterized by a transition between the adjacent "0"s, and by appropriately inhibiting that transition, thus creating a pulse which is three times the duration of a unit cell, hence giving rise to a new fourth frequency which cannot be normally created by any succession of "1"s or "0"s.

5 Claims, 5 Drawing Figures

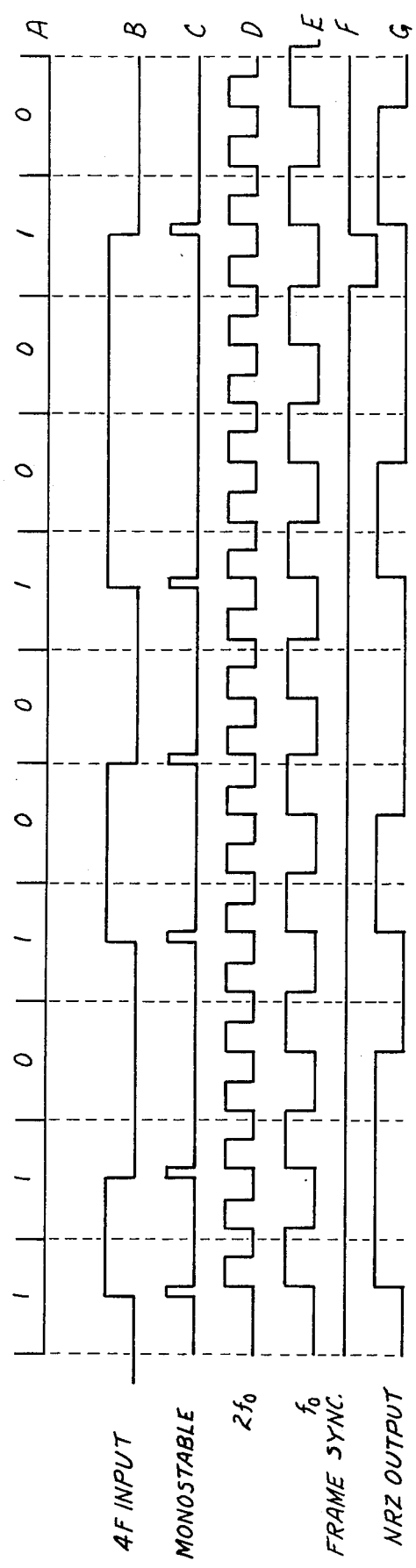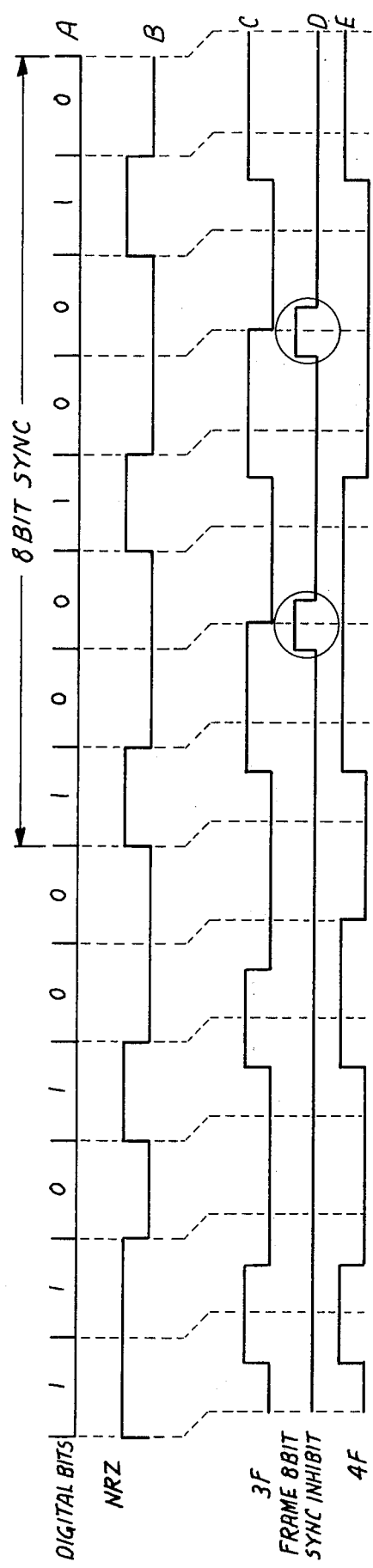

DIGITAL FRAME SYNCHRONIZING CIRCUIT

BACKGROUND OF THE INVENTION

(1) Field of the Invention

This invention relates to digital information processing, particularly as such information is processed for transmission and/or recording such as in magnetic tape recorders. In particular, it relates to systems and methods for providing digital signals which are self-clocking and which facilitates serially encoding information into frames while minimizing bandwidth requirements.

(2) Description of the Prior Art

With the advent of digital data communication, transmission and recording systems, a number of schemes for encoding data in digital form have been developed. While early codes were not self-clocking, and therefore required a separate clock or synchronization channel to ensure reliable decoding, more recent and widely used codes such as non-return to zero mark (NRZ-M) have been developed in which a clock or bit sync signal is built into the data code to enable self-clocking and the elimination of a separate sync or clock track.

In NRZ-M recording, a transition is provided only when a digital one occurs, and no transitions are provided when digital zeros occur. Thus, a series of "1"s or "0"s will essentially result in a shift in the DC level. Because such a code has no way to define a unit or bit cell, it is not self-clocking, and clock information must be added on separate tracks, with an attendant waste of record medium or transmission equipment, as well as limiting the ultimate density of recording due to potential skew errors. Nevertheless, NRZ recording is the workhorse of the recording industry due to the efficient bandwidth requirements and ready implementation.

Because random sequences of "1"s and "0"s can result in pulse sequences having long equivalent wavelengths, other codes, such as phase modulation (PM) have been developed. In PM codes, the bandwidth is reduced to one octave by providing an output for each bit, whether it be a one or zero, thus also making the code self-clocking. Since in PM codes, for example, a "0" may be represented as a positive transition at the center of the bit cell, a succession of either "1"s or "0"s may be seen to generate a frequency $f_o = 1/c$, where $c$ is the duration of a unit or bit cell. Analogously, a succession of 1-0-1-0 bits may be seen to generate a frequency of $f_o/2$, i.e., a frequency having a period equal to twice the cell duration. The possible generation of two characteristic frequencies has resulted in this code sometimes being identified as 2F code.

In order to avoid problems with the detection of the polarity of transitions, the Miller code, otherwise known as the delay modulation (DM), modified frequency modulation (MFM) or 3F code has also been developed. See U.S. Pat. No. 3,108,261 (Miller). In that code format, "1"s are represented as transitions at a particular location of the respective bit cells, such as at the center of bit cells, regardless of the polarity, and "0"s are represented as the absence of a transition at the particular location of a cell, and the insertion of a transition at the beginning of a cell if the preceding cell is also a zero. Thus, in that system, a succession of "1"s or "0"s will give rise to a first frequency $f_1 = \frac{1}{2}c$. Similarly, it may be readily appreciated that a succession of 1-0-1-0 digits results in the generation of a second frequency $f_2 = f_1/2 = \frac{1}{4}c$, while a succession of 1-0-0-1-0-0-1 digits results in the generation of a third frequency $f_3 = 2f_1/3 = \frac{1}{3}c$.

The three frequencies possible of being generated thus give rise to the 3F nomenclature. The primary virtue of the Miller code is that while the bandwidth of the code is essentially the same as that of the NRZ code, self-tracking capability is added, albeit at the expense of a need to generate a ½ bit cell time, hence a 2f clock, and the inability to recover requisite phase information in order to properly decode the signal back to NRZ upon playback until a 1-0-1 sequence is received.

In addition to such systems for establishing bit sync or self-clocking capabilities, it is also desirable to utilize formats in which incoming data is partitioned into blocks or frames of data such that error checking code words, parity and the like may be inserted. Such schemes likewise require the addition of a unique succession of bits as a frame sync word to delineate each frame. Prior art frame sync codes generally require storage systems in which entire frames are delayed in temporary memories upon playback and frame synchronizer circuits "look" at the entire frame to determine the presence of a particular alternating pattern (see U.S. Pat. No. 4,002,845). In other frame synchronizer systems, a long pulse such as provided in Miller Code by a succession of "0"s has also been suggested, but is undesirable in that it adds a significant DC component which greatly expands the bandwidth requirements. Similarly, a high frequency, such as four or more multiples of a basic clock rate may also be employed, again at the expense of system complexity and greater bandwidth.

SUMMARY OF THE INVENTION

In the present invention, a frame synchronizing circuit is provided in which a basic Miller encoding circuit is modified to provide a frame sync pulse having a duration equal to three bit cells, thus generating a fourth, lower frequency, $f_4 = 1/6c$. Such fourth frequency utilizes the available low frequency portion of the spectrum without requiring any additional high frequency bandwidths. The resultant frame sync pulse cannot result from any normally allowed transition of "1"s and "0"s and may, upon playback, be readily detected by means responsive to the $f_4$ frequency. The frame synchronizing circuit thus comprises means for generating a Miller coded digital signal consisting of a sequence of digital bits 1-0-0-1 and for inhibiting a transition between the 0—0 sequence thereof, whereupon a signal block having a duration equal to three bit cells is generated. This signal block has associated therewith a fourth frequency which cannot naturally occur from any sequence of digital "1"s or "0"s. The circuit further comprises means for inserting the signal block into a formatted digital data stream at a predetermined location. Preferably, such a block would be inserted at least once for every frame of a predetermined number of bits formatted data to provide a frame sync signal which can be subsequently readily and simply detected and operated on by means responsive to the presence of the fourth frequency to delineate each frame.

BRIEF DESCRIPTION OF THE INVENTION

FIG. 4 is a set of characteristic signals such as may be processed through the circuit of FIG. 3; and FIG. 5 is a set of characteristic signals such as may be processed in an alternative embodiment for forming a frame synchronization signal pursuant the present invention.

DESCRIPTION OF THE PREFERRED EMBODIMENTS

Figure 1:
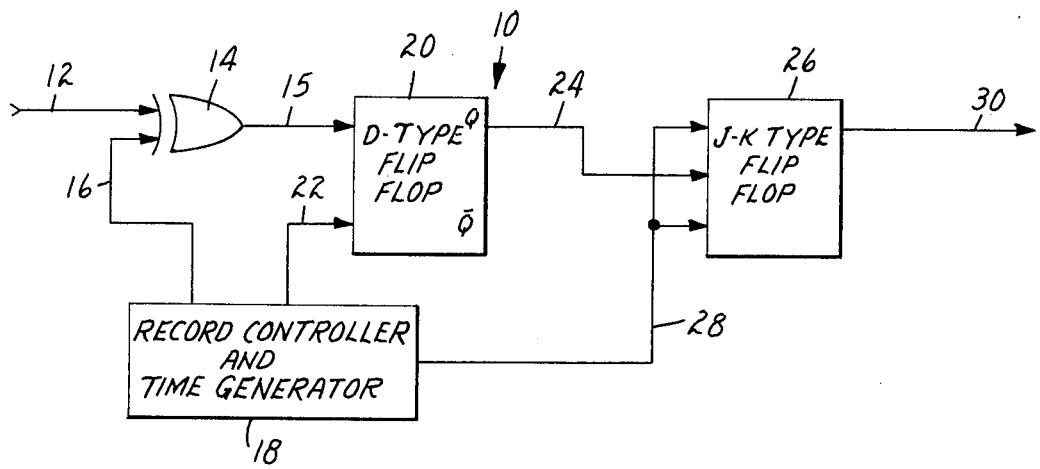
FIG. 1 is a block diagram of a preferred circuit for forming the frame synchronizing signal pursuant the present invention.

FIG. 1 shows a block diagram of a preferred embodiment of the circuit for forming the frame synchronization signal according to the present invention. The encoding circuit 10 is adapted to receive a digitally encoded non-return to zero (NRZ) signal on lead 12 at one input to an exclusive OR gate 14. The other input to the gate 14 is controlled by a signal on lead 16 from a record controller and time generator circuit 18. The circuit 18 is of conventional design and is not discussed in full herein. The circuit 18 typically includes crystal clock oscillators, shift registers and the like for generating appropriate timing signals to convert a continuous stream of digital bits into a run length limited code in which the digital bits are partitioned into a succession of frames, each of which contains a predetermined number of bits and in which each frame is provided with appropriate parity check words, error check words and frame synchronization words. When the gate 14 is appropriately strobed by a $f_o$ bit sync signal from the record controller and time generator 18, the gate allows the NRZ signals on lead 12 to pass therethrough to a D-type flip-flop 20. The flip-flop 20 is clocked by a clock signal at twice the bit sync rate (i.e., $2f_o$) from the record controller and time generator 18 on lead 22. The output of the flip-flop 20 is coupled to the toggle input of a J-K type flip-flop 26. The J-K inputs of flip-flop 26 are controlled by a frame inhibit signal on lead 28 from the record controller and time generator 18, which input signal occurs once for every frame and thus completes the formation of the frame sync signals as will be described hereinafter. A thus encoded signal complete with bit sync and frame sync information appears at the output of the flip-flop 26 on lead 30.

Figure 2:
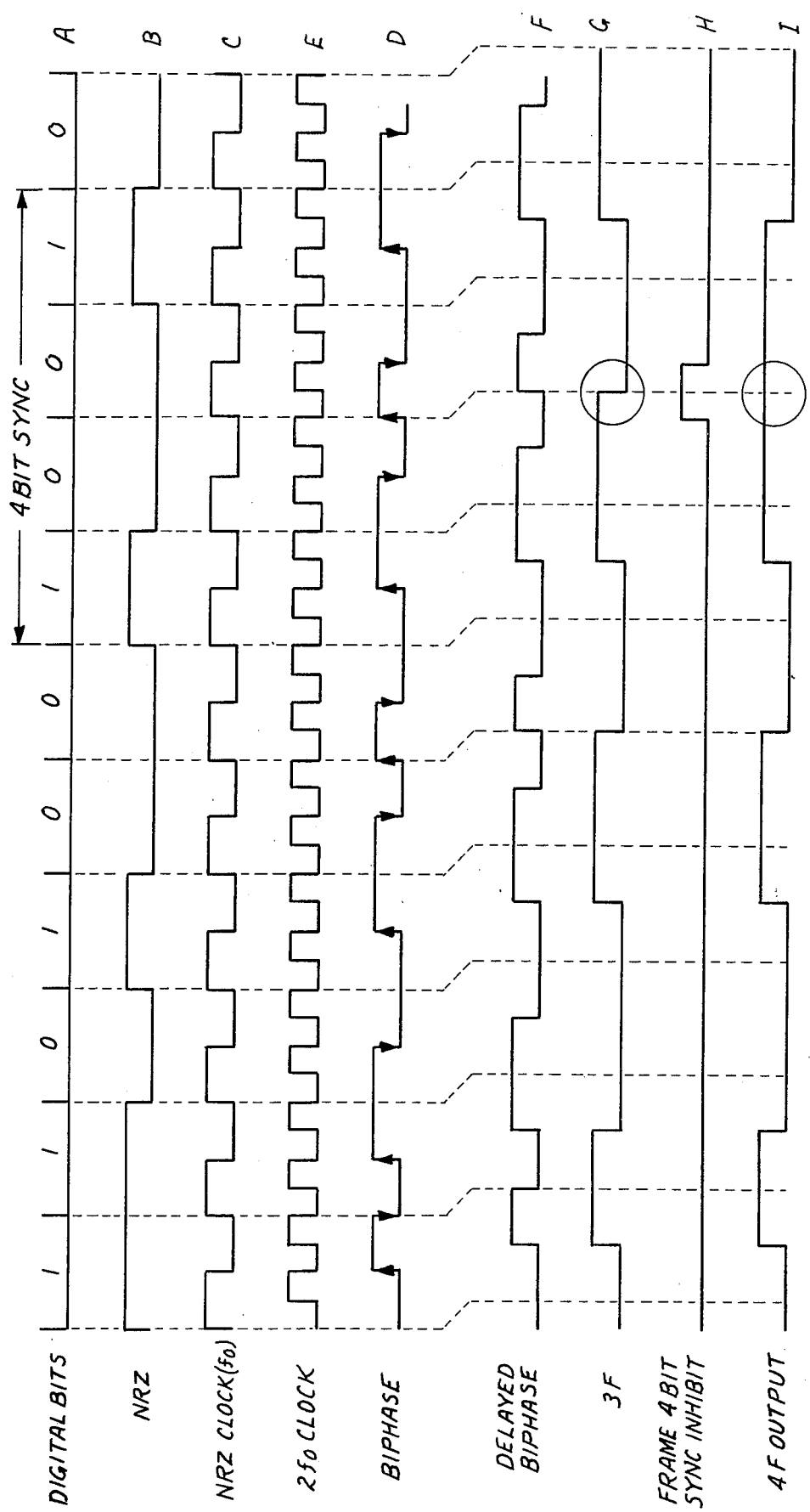
FIG. 2 is a set of characteristic signals such as may be processed through the circuit of FIG. 1.

The manner in which the circuit of FIG. 1 processes incoming NRZ signals is most readily explained in conjunction with the set of wave forms set forth in FIG. 2. As may there be seen, an incoming signal may comprise a succession of digital bits such as a succession of the following digital bits: 1-1-0-1-0-0-1-0-0-1-0 shown in curve A. The NRZ equivalent of such a succession of bits as set forth in wave form B would thus be provided at lead 12 of FIG. 1. The digital bits within the first six unit cells shown in wave form A and as NRZ encoded in wave form B represent actual digital bits of incoming data. The next four bits comprise a four bit sync signal consisting of digital bits 1-0-0-1. These bits are inserted at the end of a predetermined number of digital bits comprising a given frame by conventional circuits, typically including shift registers, parallel to serial converters, etc. Thus, for example, a digital 1-0-0-1 signal may be provided by a quad two input multiplexer, four inputs of which are hard-wired to provide a digital 1-0-0-1 sync word pattern. Thus, when appropriately strobed, input data bits will be temporarily stored and the sync word 1-0-0-1 outputted in the appropriate spatial position. The bit sync clock at the fundamental frequency $f_o$ as provided by the record controller and time generator 18 on lead 16 to the exclusive OR gate 14 is shown as wave form C of FIG. 2.

By an exclusive OR function in which the bit clock is combined with the input NRZ signal on lead 12 in gate 14, the NRZ signal is converted to a biphase or Manchester code on lead 15 of FIG. 1. Such a biphase code is shown in wave form D of FIG. 2. The input NRZ signal, constituting high states for the digital "1"s and low states for the digital "0"s are thus converted, analogously, in the biphase or Manchester code such that digital "1"s are represented as positive transitions in the center of each unit cell while the digital "0"s are represented by negative transitions in the center of each unit cell. Such a signal may then conveniently be converted to a Miller or 3F code by applying the signal to a divide by two circuit in a conventional manner. (See, for example, U.S. Pat. No. 4,045,613.) However, a close examination of the biphase signal of wave form D reveals spikes outputted from the exclusive OR gate 14 at the beginning of each unit cell when the existing level of the signal is at a low state. Such spikes are believed to be caused by inherent timing errors between the input NRZ signal and the $f_o$ clock on lead 16. Although such errors may be reduced by proper design, it is believed to be virtually impossible to eliminate them, and the resulting spikes may be sensed by the divide by two biphase/Miller conversion circuit, resulting in false output transitions. Preferably, therefore, the output of the exclusive OR gate 14 is coupled to the D-type flip-flop 20 which is synchronously clocked on lead 22 with the bit sync clock on lead 16, but at a rate $2f_o$ as shown in wave form E of FIG. 2. Accordingly, the input wave form on lead 15 is effectively sampled slightly after each of the transitions, and thus provides a delayed biphase signal on the output of the flip-flop 20 on lead 24. Such a delayed biphase signal is shown as wave form F of FIG. 2. Each bit cell is now denoted as being delayed in time one-half of the 2F clock period, or equivalently a fourth of a unit cell. This delayed biphase signal is coupled to the J-K flip-flop 26 to achieve the divide by two biphase/Miller conversion function noted above.

The J-K inputs of the flip-flop 26 are controlled by the frame inhibit signal on lead 28 from the record controller 18, in such a manner that the J-K inputs are brought low sufficiently ahead of the transition occurring in the Miller or 3F code signifying the two sequential "0"s in the desired sync word. See the circled transition in wave form G of FIG. 2. The transition between the successive "0"s in the 1-0-0-1 sync word is thus inhibited at the output of the J-K flip-flop 26. This inhibition is provided by frame inhibit signal such as shown in wave form H on the lead 28, wherein a single pulse occurring once for every frame thus brings the J-K inputs to a low state at the appropriate time. With the inputs of the flip-flop 26 thus restricted, the transition between the successive "0"s within the four bit sync word is inhibited and the resultant 4F output on lead 30 as shown in wave form I results. The transition at the circled portion of that wave form is absent, thus resulting in a pulse extending three unit cells in duration. This resultant frame sync signal represents a fourth frequency or time period which may thus be readily detected as set forth hereinafter.

Figure 3:
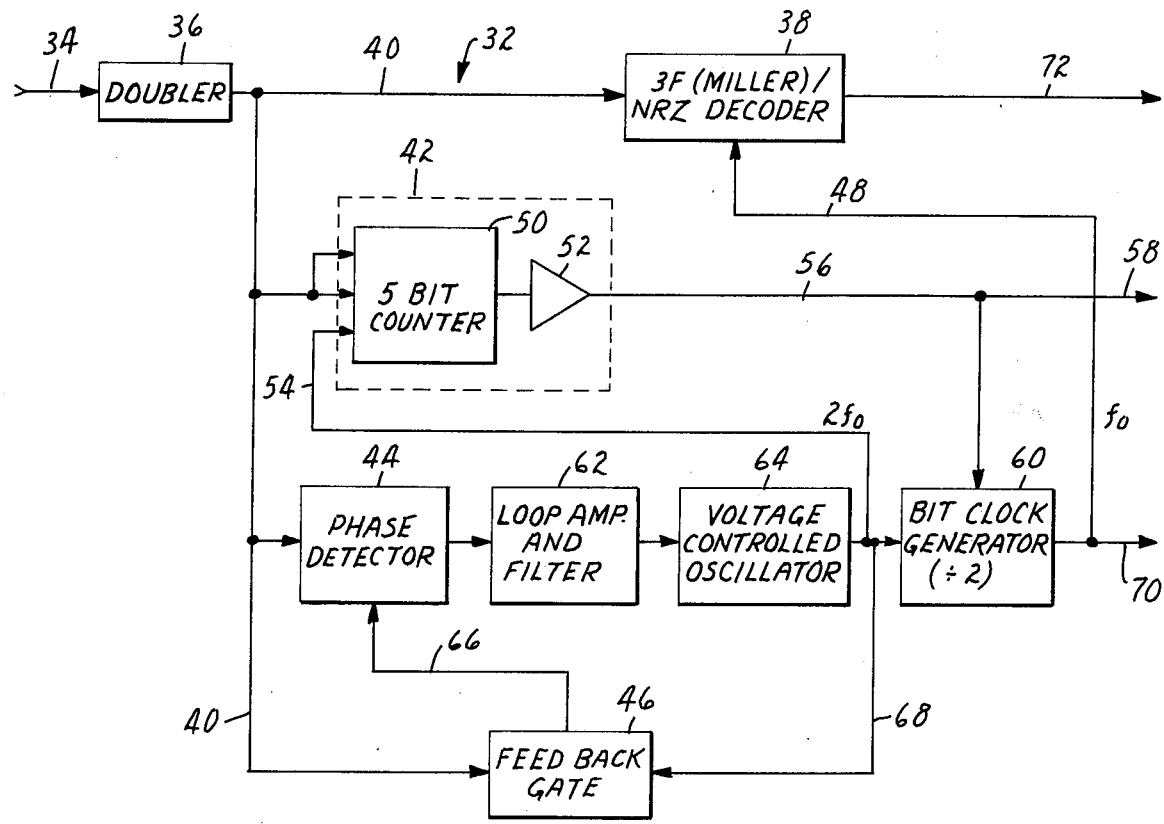
FIG. 3 is a block diagram of a preferred circuit for decoding the frame synchronization signal.

A preferred companion circuit for detecting the frame sync signal is shown in FIG. 3. In this figure, an input 4F signal such as provided after the encoded signal has been recorded on a suitable record medium, such as magnetic recording tape, and retrieved via a conventional magnetic playback head is inputted on lead 34. The input signal is coupled to a doubler circuit 36 which includes a monostable multivibrator, so as to provide a monostable output pulse for each "0" crossing of the input 3F signal. The output of the doubler 36 is in turn coupled to a 3F or Miller/NRZ decoder circuit 38 on lead 40. The signal from the doubler 36 is applied on leads 40 to a sync detector network 42, to a phase detector 44 and to a feedback gate 46. A regenerated bit clock signal is further provided to the 3F/NRZ decoder circuit 38 on lead 48, which signal is used together with the signal on lead 40 to convert the 4F signal back to an NRZ output signal.

The output from the monostable multivibrator within the doubler 36 resets the sync detector 42 upon each transition signifying a digital bit. The sync detector 42 preferably consists of a five bit counter 50 and an inverter 52. The decoder circuit 32 also includes means for regenerating a $2f_o$ clock signal, which is coupled to the five bit counter 50 on lead 54. The manner in which this signal is regenerated will be discussed hereinafter. As will be seen in more detail in conjunction with the discussion of FIG. 4, the application of successive pulses of the $2f_o$ on lead 54 to the counter 50 during the occurrence of a signal on lead 40 corresponding to a frame sync pulse extending three unit cells in duration will enable the counter to reach a count of five during the third NRZ unit cell period. The only time that such five 2F clock periods could take place during adjacent transitions would be during such a sync period; otherwise, the occurrence of a transition on the lead 40 indicative of another digital bit would reset the decade counter and thus would prevent the counter 50 from providing an output signal. Since an output from the counter 50 can only be thus provided if no reset signal is provided during five $2f_o$ pulses, the peculiarity of the frame sync signal is detected. The output of the counter 50, indicative of a frame sync signal is coupled to the inverter 52 and is provided as an output frame sync signal on lead 56 to control peripheral equipment on an output terminal 58, as well as to provide a frame sync input signal to the bit sync generator 60, to control the phase of the bit sync in a manner to be described hereinafter.

The basic bit synchronization and clock regeneration portion of the decoder circuit 32 utilizes a phase lock loop network shown as the blocks including the phase detector 44 together with a loop amplifier and filter circuit 62, a voltage controlled oscillator 64 and the feedback gate 46. The feedback gate is desirable inasmuch as transitions in the input 4F signal occur at 1, 1½ and 2 bit cell spacings. The gate 46 couples the feedback signal from the voltage controlled oscillator 64 to the phase detector 44 on lead 66 only when an input pulse from the monostable multivibrator on lead 40 is available for phase comparison. When the appropriate phase is present, the reset signal is coupled through the phase detector 44 to the loop amplifier and filter 62. The signal is thus amplified and filtered to provide loop stability and to remove undesirable high frequency components. The thus filtered signal is then coupled to the voltage controlled oscillator 64 to provide control of the operating frequency. Since the reset signals on lead 40 from the monostable multivibrator occur at twice the normal bit rate, the output from the oscillator 64 thus comprises the $2f_o$ clock signal which is fed into the five bit counter 50 on lead 54 as discussed hereinabove. Further, the $2f_o$ signal is coupled to the feedback gate 46 on lead 68 where it is gated to lead 66 to enable the comparison with the input signal on lead 40. The $2f_o$ signal on lead 68 from the voltage controlled oscillator 64 is also coupled to the bit sync generator 60, which is a divide by two circuit, thereby providing a bit clock signal at a frequency $f_o$ on the output lead 70. This signal is also coupled to the 3F/NRZ decoder on lead 48 as discussed above. The bit clock generator, or divide by two circuit, is desirably a J-K type flip-flop. As such a flip-flop is not phase sensitive, the frame sync signal on lead 56 is provided to this circuit such that the proper phase relationship is established between the primary data signal on lead 72 and the reconstructed bit clock signal on lead 70.

The decoder 38 is conventional in design and does not constitute a direct part of the present invention. Such a decoder typically comprises a series of shift registers and timing circuits so as to perform the inverse conversion from the 3F signal into a standardized NRZ output signal on lead 72.

The manner in which the signals are thus processed in the circuit shown in FIG. 3 is more readily appreciated in view of the wave forms set forth in FIG. 4, which figure is further desirably viewed in conjunction with the signals as encoded and as shown in FIG. 2. In FIG. 4, the same digital bits presented in FIG. 2 are shown to be provided on wave form A as a 4F input (wave form B). The 4F input thus corresponds to wave form I of FIG. 2. As the 4F input signal is processed through the monostable multivibrator of the doubler 36, an output is provided in which a transition occurs at each zero crossing, as shown in wave form C. As that signal is processed through the phase lock loop circuit, including the phase detector 44, loop amplifier and filter 62 and voltage control oscillator 64, a $2f_o$ signal is regenerated on leads 54 and 68 as shown in wave form D. The $2f_o$ signal is divided by two within the bit sync generator 60 to provide the $f_o$ signal shown in wave form E. Similarly, when five $2f_o$ pulses on lead 56 are counted by the five bit counter 50 without a reset signal on lead 40 causing the counter to be reset, a frame sync signal is provided on lead 56 as shown in wave form F. The $4f$ signal as appropriately decoded within the decoder 38 is then provided as an NRZ output on lead 72 as shown in wave form G.

The present invention enables a further advantageous feature over that provided with conventional 3F or Miller code systems in that it enables the sync detector to be reset each time a pulse occurs from the monostable multivibrator within the doubler 36. Thus, unlike that required with a Miller code where one necessarily must wait until the occurrence of a 1-0-1 pulse sequence in order to determine the correct phase of the bit clock, in the present invention one need look only at a single bit, since the phase information is already provided via the phase detector 44. Further, the need for redundant circuits to detect the proper phase signal as is necessary in Miller decoders is eliminated.

In digital recording, one normally wants to maintain the DC component of the recorded signal, but does not want a long string of successive "0"s or "1"s to shift the DC level. Thus, for example, in the embodiments of the present invention set forth above, the frame sync pulse, extending three bit cells in duration, may be sufficient to result in an undesirable DC level shift. Accordingly, in a further preferred embodiment shown in FIG. 5, an eight bit frame sync signal, as opposed to the four bit frame signal shown in FIGS. 1-4, may be provided. In such an embodiment, an eight bit succession of digital bits 1-0-0-1-0-0-1-0 may be provided, as shown in wave form A of FIG. 5. The NRZ equivalent signal for such a train of digital bits is shown in wave form B. As converted in a manner similar to that shown in FIGS. 1 and 2, the resultant 3F signal will be as shown in wave form C. The frame sync signal is then provided by inhibiting both pairs of 0-0 transitions, such as by providing an eight bit frame inhibit signal, wherein, as shown in the circled portions of wave form D, two inhibit pulses are provided. As further shown in wave form E, these inhibit pulses result in a pair of frame sync pulses, each extending three unit cells in direction and of opposite polarity. Any DC shift as may result from the first three unit cell duration pulse are thus averaged out by the second but opposite polarity three unit cell duration pulse.

In conventional Miller code systems, a full length word is generally provided for frame synchronization functions. In the embodiments set forth in FIGS. 1-4, only four bits are required for the frame sync function, thus making additional bits available for use in controlling auxiliary functions. For example, the additional bits may be used to signify the tape speed during recording such that upon playback, timing control signals may be appropriately modified. Alternatively, other functions such as analog ranging signals and other clocking or function control signals may be provided on the additional bits without requiring further bits to be added to a data frame.

This foregoing description assumes the insertion of a frame sync word once for each frame. It is similarly within the scope of the present invention that a frame sync signal be inserted at other places within the data stream, such as only providing such a signal once every 10 frames or even less often, depending upon the stability of the given data system.

While the circuit described above is desirably utilized in a magnetic recording apparatus such as an analog digitized recorder, the synchronization circuit has similar applications in a variety of instrumentation circuits and/or information processing applications. Accordingly, while only a limited embodiment of the present invention has been shown and described in detail, it will now be obvious to those skilled in the art that many modifications and variations which satisfy many or all of the objects of the invention but which do not depart from the spirit of the invention as described by the appended claims will be included within the scope of the present invention.

What is claimed is:

1. In a digital information processing system in which digital information is formatted in a 3F delay modulation (Miller) code in which digital "1"s are represented as transitions at a particular location such as at the center of a bit cell and "0"s are represented as the absence of transitions at that location and by a transition at the start of a bit cell if the preceding bit was also a "0", such that allowable transitions occur at intervals corresponding to the durations of two bit cells, one and one-half bit cells and one bit cell respectively, thereby creating three respective frequencies $f_o$, $1\frac{1}{2} f_o$ and $2f_o$, and wherein a plurality of digital bits are serially combined to form a digital word and a plurality of words are serially combined to form a succession of frames making up a stream of digital bits, at least one word of each frame being dedicated to providing a frame sync code, a frame synchronizing circuit comprising means for generating a digital signal consisting of a sequence of digital bits 1-0-0-1 and for inhibiting a transition associated with the 0-0 transition in said 1-0-0-1 sequence, whereupon there is generated a digital signal block characterized by a pair of previously unallowed transitions occurring three bit cells apart, thus generating a fourth frequency, $f_1/2$ which cannot naturally occur by any sequence of digital "1"s and "0"s, and means for inserting said digital block into the formatted digital data stream at a predetermined location to provide a frame sync signal which can be subsequently readily and simply detected and operated on by means responsive to said fourth frequency.

2. In a system according to claim 1, wherein said frame synchronizing circuit includes shift register means adapted to receive a plurality of parallel inputs to generate said 1-0-0-1 sequence and switch means responsive to the shift register means to inhibit the sequential outputting of digital bits at the end of a said predetermined number of bits to enable the insertion of digital block following said predetermined number of bits.

3. In a system according to claim 1, wherein the system further comprises decoding means for detecting said frame sync signal comprising counter means resettable by each transition in a received digital signal for counting the number of bit cells following each said transition and for regenerating a frame sync signal in the event a duration greater than 5/2 the length of a unit cell elapses between said transitions in a said received digital signal.

4. A system according to claim 3, wherein said decoding means includes a low frequency pass filter tuned to pass said fourth frequency.

5. A system according to claim 3, wherein said decoding means further includes means responsive to said regenerated frame sync signal for generating a properly phased bit sync signal therefrom.

* * * * *

UNITED STATES PATENT AND TRADEMARK OFFICE
CERTIFICATE OF CORRECTION

PATENT NO. : 4,124,778
DATED : February 21, 1978
INVENTOR(S) : Peter Amass

It is certified that error appears in the above-identified patent and that said Letters Patent are hereby corrected as shown below:

At Column 8, lines 19-20, delete "previously unallowed".

Signed and Sealed this

Fifth Day of August 1980

[SEAL]

Attest:

SIDNEY A. DIAMOND

Attesting Officer

Commissioner of Patents and Trademarks